Sept. 2, 1958 R. HERMITTE 2,850,556
PRIMABLE ELECTRIC CELLS
Filed Sept. 7, 1955

2,850,556

PRIMABLE ELECTRIC CELLS

René Hermitte, Vanves, France

Application September 7, 1955, Serial No. 532,934

Claims priority, application France September 9, 1954

2 Claims. (Cl. 136—91)

This invention relates to deferred action batteries.

It is an object of the invention to provide an improved deferred action battery in which the cell unit or units are completely insulated and in which the electrolyte can be maintained in fluid tight manner.

To achieve its objects, the invention contemplates an electric cell which especially comprises members, rigid in themselves or supported by rigid supports, and which are adapted to penetrate, when the cell is put into use, into a cellular chamber having at least one wall of low mechanical strength and containing a suitable priming liquid. A features of the invention is that each complete cell element (that is to say complete cell unit with its reservoir of electrolyte) constitutes a single unit insulated from the adjacent cell units belonging to the same battery by a casing of flexible material.

An arrangement of this kind enables the cell units to be readily combined in any desired numbers, while at the same time the risk of conductive or stray contacts due to the electrolyte are eliminated.

Further features of the invention will be found in the description which follows with reference to the accompanying drawing, which show by way of example a deferred action cell unit constructed in accordance with the invention.

Figure 1:
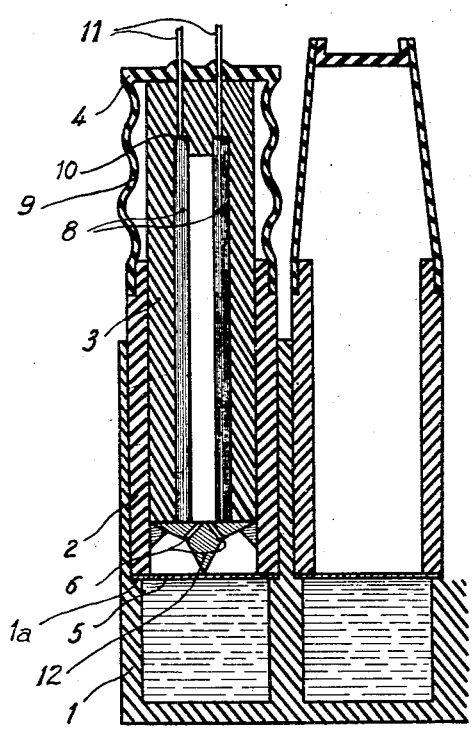
Fig. 1 is a vertical cross-section of two electric cell units before priming.

The cell unit of a battery (see Fig. 1) is in accordance with the invention constituted by a cup or a container 1 of plastic material which contains the electrolyte. This container is provided, at a level close to that of the upper surface of the electrolyte, with a shouldered portion 1a on which is supported a guide member 2 of plastic material fixed to the container 1 and having the form of a cup, the base of which is formed by a fragile wall 5 of thin frangible material such as glass. Inside this cup which acts as a guide, a hollow block of plastic material 3 is arranged for sliding movement, the block comprising grooves 10 which serve to guide and to hold the electrodes 8 of the cell. These electrodes may be separated by an absorbent material.

Block 3 supports terminal 11 enabling the current produced by the battery to be coupled to a load. Its lower part terminates in a hard, projecting portion 12 which forms a tool intended to break the thin film 5; the tool is provided with holes 6 suitably distributed so as to permit of the passage therethrough of the electrolyte. An elastic or flexible cap or isolating jacket 9 covers the whole assembly and is fixed or welded to the portion 2 of the cell in order to make the whole assembly liquid-tight.

The manufacture of the assembly as described above will be carried out in accordance with the relative shapes which are to be given to the complete cells. Furthermore, all of the containers 1 may form part of a single moulded member.

If a number of stages of cell units are combined terminals 11 are mechanically coupled together. The lower parts 12 are then similarly coupled together.

The operation of the assembly of the cell units constituting a battery is effected as follows: a force applied between the upper surface 4 of the cap 9 and the lower surfaces of the container 1 will enable the tool portion of the member 3 to break the film 5 of the member 2. The electrolyte will thus be forced towards the electrodes of the cell through the holes 6 provided in the lower part of the member 3. The cell unit will thus be primed while remaining a liquid-tight unit due to the cover 9.

Figure 2:
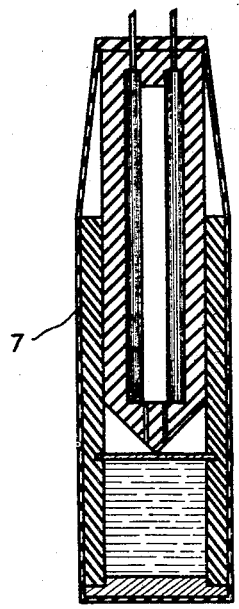
Fig. 2 is a vertical cross-section of an alternative form of cell unit before priming.

An alternative form of this assembly, shown in Fig. 2, is very similar to that of Fig. 1 with the exception that the elastic portion 7 encloses the whole cell unit including the electrolyte container, and that the members 1 and 2 are formed as a single piece. In certain types of batteries, this alternative may simplify the manufacture.

Figure 3:
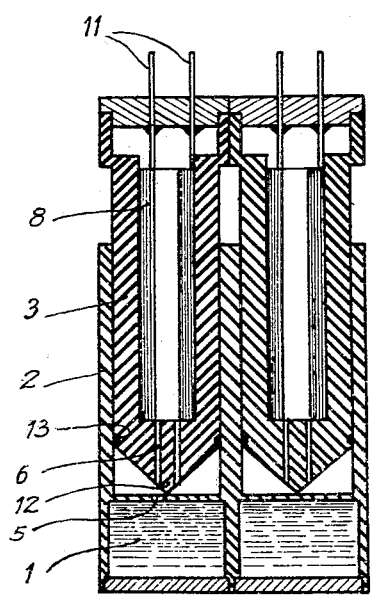
Fig. 3 is a vertical cross-section of still another form of cell unit before priming.

In accordance with a further embodiment of the invention shown in Fig. 3, the body 3 containing the electrodes is provided with transverse grooves 13, which are filled with a grease of suitable viscosity, so that the slide takes the form of a piston which discharges the electrolyte into the interior of the cell unit. The ring of grease ensures liquid tightness between the members 2 and 3.

1. A deferred action battery comprising a block, two electrodes fixedly spaced and supported by said block, a guide defining a bore for slidably accommodating said block, an electrolyte container connected with said guide, a fragile wall constraining the electrolyte from passing into said guide, terminals coupled to said electrode and extending outwardly from said block, a flexible isolating jacket hermetically engaging said terminal and block and at least said guide for rendering said battery fluid tight while permitting the sliding of said block in said guide, and a piercing member on said block in proximity to said fragile wall for piercing the latter whereby the electrolyte may activate said electrodes, said piercing member constituting a piston in said bore and defining an aperture for the passage of the electrolyte whereby said electrolyte is positively discharged from the container.

2. A battery as claimed in claim 1, said isolating jacket enclosing said guide and said container.

References Cited in the file of this patent

UNITED STATES PATENTS

| Re. 15,846 | French | May 27, 1924 |
| 1,218,847 | Firey | Mar. 13, 1917 |
| 1,542,705 | Koretzky | June 16, 1925 |
| 2,452,049 | Hauck | Oct. 26, 1948 |

FOREIGN PATENTS

| 233,437 | Great Britain | May 11, 1925 |
| 505,472 | Belgium | Sept. 15, 1951 |
| 691,165 | Great Britain | May 6, 1953 |
| 1,093,523 | France | Nov. 24, 1954 |